United States Patent
Suciu et al.

(10) Patent No.: US 8,087,885 B2
(45) Date of Patent: Jan. 3, 2012

(54) STACKED ANNULAR COMPONENTS FOR TURBINE ENGINES

(75) Inventors: Gabriel L. Suciu, Glastonbury, CT (US); Gary D. Roberge, Tolland, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1265 days.

(21) Appl. No.: 11/719,603

(22) PCT Filed: Dec. 1, 2004

(86) PCT No.: PCT/US2004/040206
§ 371 (c)(1),
(2), (4) Date: May 17, 2007

(87) PCT Pub. No.: WO2006/110125
PCT Pub. Date: Oct. 19, 2006

(65) Prior Publication Data
US 2009/0155079 A1 Jun. 18, 2009

(51) Int. Cl.
*F01D 5/06* (2006.01)

(52) U.S. Cl. .......... 415/199.4; 416/204 A; 416/201 R; 416/244 A

(58) Field of Classification Search .......... 415/174.5, 415/199.4, 199.5; 416/193 A, 198 A, 198 R, 416/201 R, 204 R, 204 A, 244 A, 248
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,689,682 A * | 9/1954 | Boyd et al. | 416/194 |
| 2,698,711 A | 1/1955 | Newcomb | |
| 2,801,789 A | 8/1957 | Moss | |
| 2,830,754 A | 4/1958 | Stalker | |
| 2,832,565 A * | 4/1958 | Thomas et al. | 416/198 R |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |

(Continued)

FOREIGN PATENT DOCUMENTS

GB 716263 9/1954

(Continued)

*Primary Examiner* — Edward Look
*Assistant Examiner* — Ryan Ellis
(74) *Attorney, Agent, or Firm* — Carlson, Gaskey & Olds, P.C.

(57) ABSTRACT

Improved annular components and improved methods for assembling annular components into a turbine engine are described with respect to an axial compressor having a plurality of annular compressor rotor airfoil assemblies (120) as an example. Each compressor rotor airfoil assembly comprises an annular rotor portion (122), a spacer portion (124) extending axially therefrom and a plurality of airfoils (52) extending radially therefrom. The plurality of airfoils may be integrally formed with the annular portion. The compressor rotor airfoil assemblies are stacked sequentially on a center-tie (134) or outer circumferential tie. The spacer portion of one compressor rotor airfoil assembly (120*a*) abuts the annular rotor portion of the adjacent compressor rotor airfoil assembly (120*b*) to retain one another on the center-tied outer circumferential tie. By stacking the compressor rotor airfoil assemblies sequentially and then retaining them, the typical split cases, flanges and rotor bolts may be eliminated.

35 Claims, 4 Drawing Sheets

U.S. PATENT DOCUMENTS

| | | | |
|---|---|---|---|
| 3,042,349 A | 7/1962 | Pirtle et al. | |
| 3,081,597 A | 3/1963 | Kosin et al. | |
| 3,132,842 A | 5/1964 | Tharp | |
| 3,204,401 A | 9/1965 | Serriades | |
| 3,216,455 A | 11/1965 | Cornell et al. | |
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flail | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,849,023 A * | 11/1974 | Klompas | 415/173.7 |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,388,963 A * | 2/1995 | Dimmick et al. | 416/198 A |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Liston et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 * | 10/2002 | Mielke et al. | 415/199.4 |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,147,436 B2 * | 12/2006 | Suciu et al. | 415/216.1 |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1* | 10/2003 | Paul | 60/262 |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| GB | 785721 | 11/1957 |
| GB | 1287223 | 8/1972 |
| GB | 2016597 | 9/1979 |
| GB | 2026102 | 1/1980 |
| GB | 2401655 | 11/2004 |
| JP | 59136501 A * | 8/1984 |
| JP | 10184305 | 7/1998 |
| WO | 9902864 | 1/1999 |
| WO | 02081883 | 10/2002 |
| WO | 2004092567 | 10/2004 |
| WO | 2006059986 | 6/2006 |
| WO | 2006059987 | 6/2006 |
| WO | 2006059993 | 6/2006 |
| WO | 2006110125 | 10/2006 |
| WO | 2006112807 | 12/2006 |

* cited by examiner

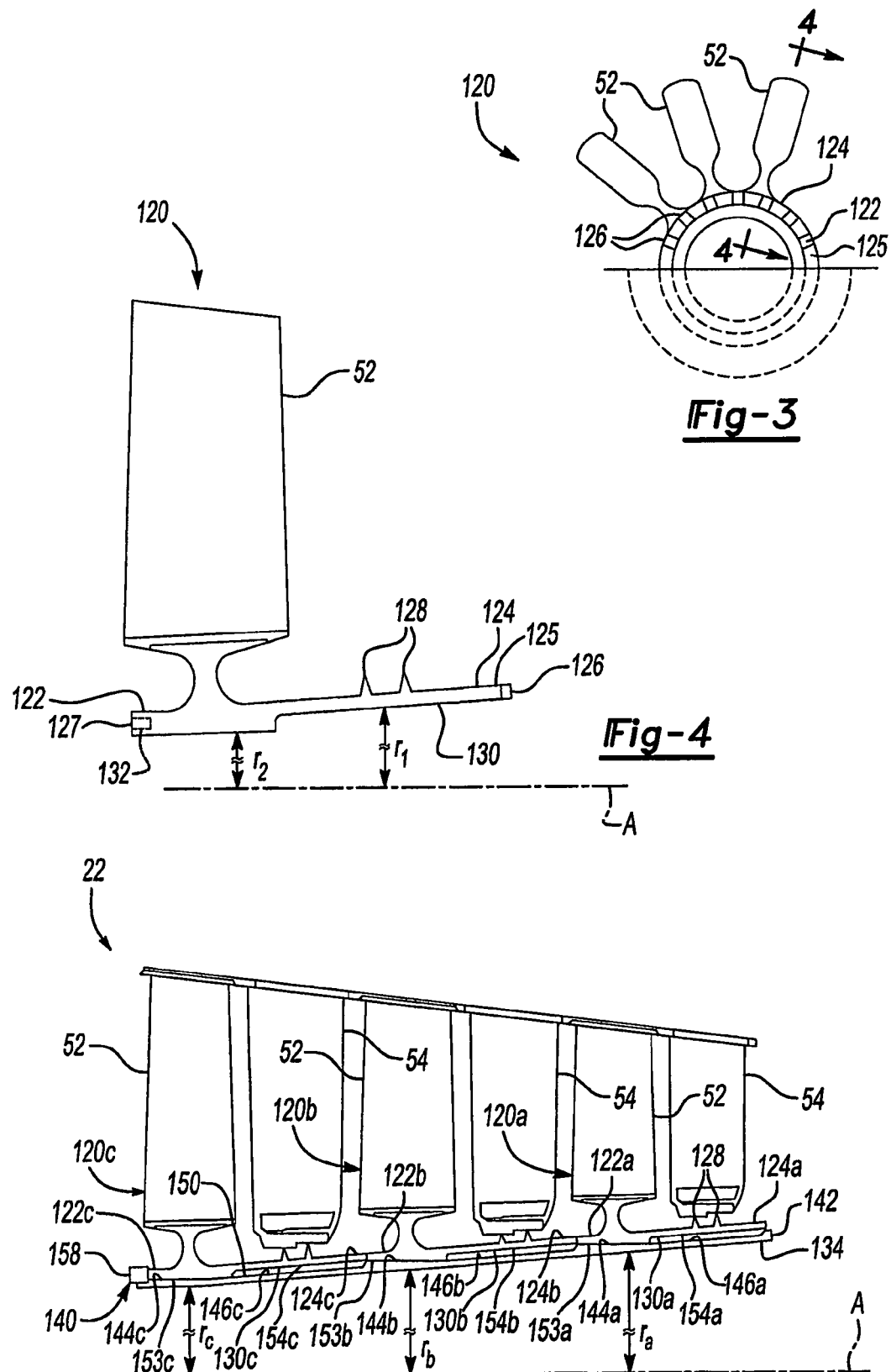

US 8,087,885 B2

STACKED ANNULAR COMPONENTS FOR TURBINE ENGINES

This invention was conceived in performance of U.S. Air Force contract F33657-03-C-2044. The government may have rights in this invention.

BACKGROUND OF THE INVENTION

The present invention relates to turbine engines, and more particularly to improved annular components, such as axial compressor components for a turbine engine, and methods of assembling same in a turbine engine.

An aircraft gas turbine engine of the conventional turbofan type generally includes a forward bypass fan, a low pressure compressor, a high pressure compressor, a combustor, a high pressure turbine, and a low pressure turbine, all located along a common longitudinal axis. The low and high pressure compressors are rotatably driven to compress entering air to a relatively high pressure. This high pressure air is then mixed with fuel in the combustor, where it is ignited to form a high energy gas stream. This gas stream flows axially aft to rotatably drive the high pressure turbine, which rotatably drives the high pressure compressor via a high spool shaft. The gas stream leaving the high pressure turbine is expanded through the low pressure turbine, which rotatably drives the forward bypass fan and the low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

Both conventional and tip turbine engines may include a low pressure axial compressor. Such low pressure axial compressors include a plurality of axial compressor rotor blade assemblies each having a compressor rotor and a plurality of compressor blades extending radially therefrom. Conventionally, each blade is separately cast to include an airfoil portion and a root portion. The root portion of each conventional blade is slidably received within one of a plurality of grooves on the axial compressor rotor and is retained therein by an enlarged portion of the root portion. These conventional root connections increase the overall weight of the axial compressor rotor blade assemblies, as do the conventional connections between the multiple axial compressor rotor blade assemblies themselves. Therefore, lighter weight connections between the blades and the rotor in axial compressor rotor blade assemblies, and between the multiple axial compressor rotor blade assemblies themselves, would be desirable.

SUMMARY OF THE INVENTION

This invention relates to improved annular components for turbine engines and improved methods for assembling such annular components into turbine engines. In one non-limiting embodiment, a turbine engine according to the present invention provides an improved compressor rotor blade assembly and an improved method for assembling compressor rotor blade assemblies into the axial compressor of a tip turbine engine. These compressor rotor blade assemblies each include an annular rotor portion and an integral spacer portion extending axially therefrom. A plurality of compressor blades extend radially from the annular rotor portion and are preferably machined from a single block of material or otherwise integrally formed with the rotor portion to form a continuous full hoop/ring component for each compressor stage.

Each compressor rotor blade assembly is stacked sequentially on a rotor center-tie along the axis of the axial compressor. The spacer portion of each compressor rotor blade assembly abuts the rotor portion of the adjacent compressor rotor blade assembly to retain the adjacent rotor blade assembly on the rotor center-tie. By stacking the compressor rotor blade assemblies sequentially and then retaining them, the typical split cases and the rotor bolts can be (but need not be) eliminated. Eliminating split case flanges and bolts reduces the weight and cost of the turbine engine. Since all the split case flanges can be eliminated, this design also lends itself to counter-rotating axial compressor and/or turbine designs where split cases would have structural difficulties.

BRIEF DESCRIPTION OF THE DRAWINGS

Other advantages of the present invention can be understood by reference to the following detailed description when considered in connection with the accompanying drawings wherein:

FIG. 3 is a schematic front view of a portion of one of the compressor rotor blade assemblies of FIG. 2.

FIG. 4 is a sectional view of the compressor rotor blade assembly of FIG. 3 taken along line 4-4.

FIG. 5 is an enlarged sectional view of the axial compressor of FIG. 2.

DETAILED DESCRIPTION OF THE PREFERRED EMBODIMENTS

Figure 1:
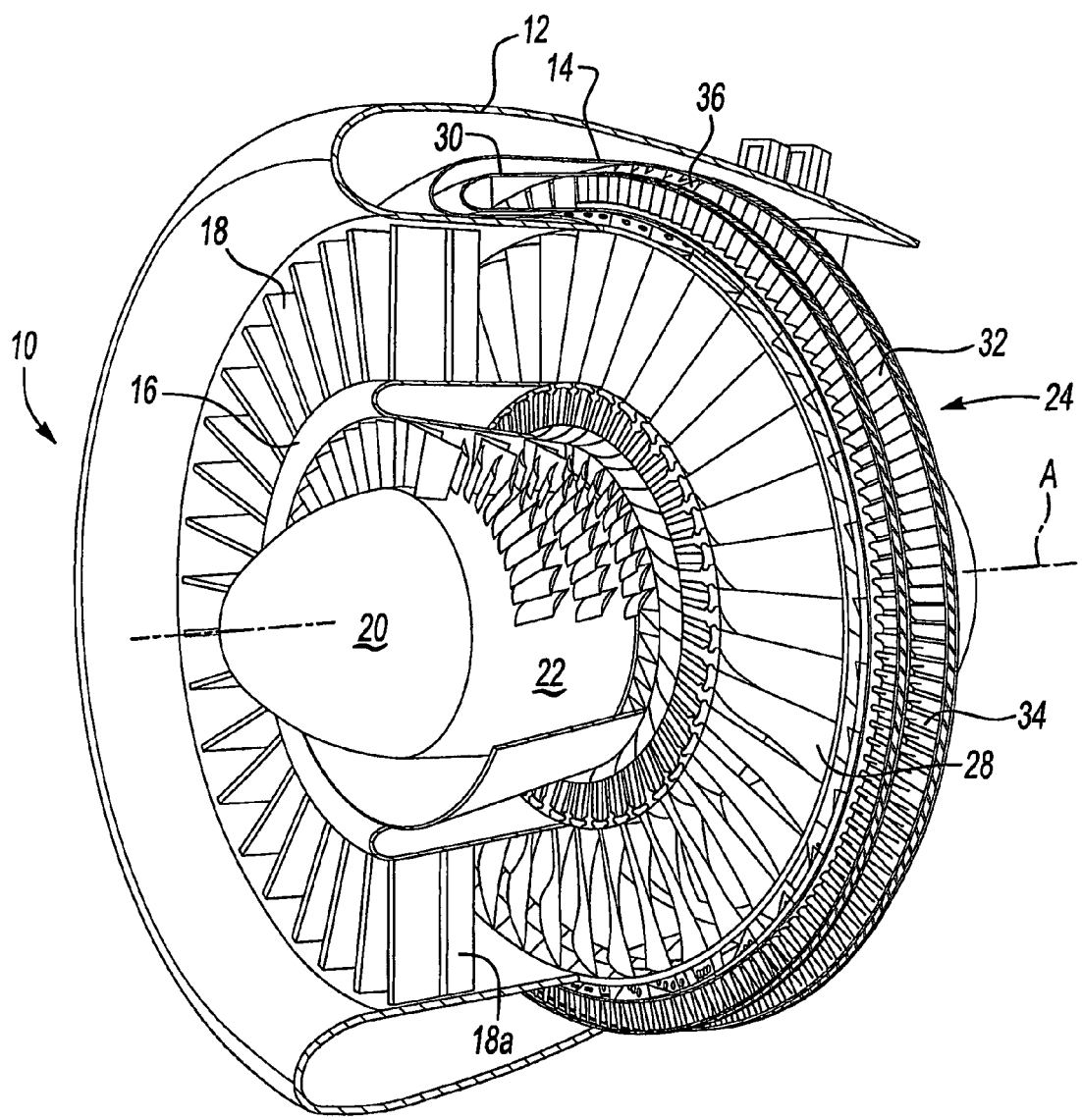
FIG. 1 is a perspective view of a tip turbine engine, partially broken away.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18a.

A nosecone 20 is preferably located along the engine centerline A to improve airflow into an axial compressor 22, which is mounted about the engine centerline A behind the nosecone 20. A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
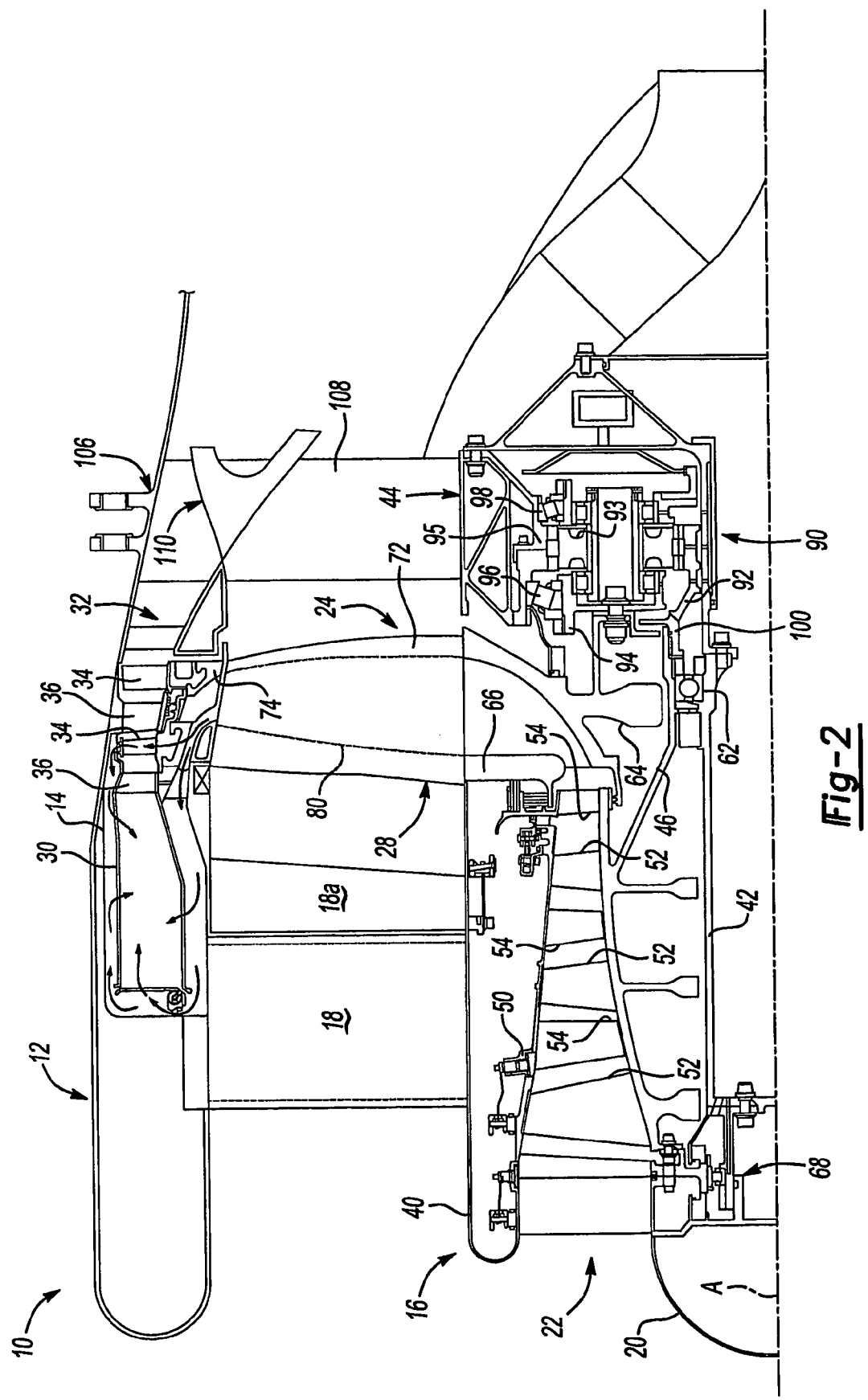
FIG. 2 is a partial longitudinal sectional view of the tip turbine engine of FIG. 1 along the engine centerline A.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor blade assembly 46 having a plurality of inner compressor blades 52 extending radially outwardly, and a fixed compressor case 50. A plurality of outer compressor vanes 54 extend radially inwardly from the fixed compressor case 50 between stages of the inner compressor blades 52. In this description and in the claims, blades, vanes or other airfoils in compressors or otherwise are referenced generically as "airfoils." The inner compressor blades 52 and outer compressor vanes 54 are arranged circumferentially about the axial compressor rotor blade assembly 46 in stages (three stages of inner compressor blades 52 and three stages of outer compressor vanes 54 are shown in this example). The axial compressor rotor blade assembly 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each fan blade 28 includes an inducer section 66, a hollow fan blade section 72 and a diffuser section 74. In operation, core airflow enters the axial compressor 22, where it is compressed by the rotation of the inner compressor blades 52. The compressed air from the axial compressor 22 enters the inducer section 66 in a direction generally parallel to the engine centerline A and is then turned from an axial airflow direction toward a radial airflow direction. The airflow is radially communicated through a core airflow passage 80 within the hollow fan blade section 72 where the airflow is centrifugally compressed by rotation of the hollow fan blades 28. The diffuser section 74 receives the airflow from the core airflow passage 80, and then diffuses the airflow and turns it once again toward an axial airflow direction toward the annular combustor 30. Preferably, the airflow is diffused axially forward in the engine 10, however, the airflow may alternatively be communicated in another direction.

The compressed core airflow from the hollow fan blades 28 is mixed with fuel in the annular combustor 30, and ignited to form a high-energy gas stream. The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 via an optional gearbox assembly 90.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

The optional gearbox assembly 90 aft of the fan-turbine rotor assembly 24 provides a speed increase between the fan-turbine rotor assembly 24 and the axial compressor 22. In the embodiment shown, the speed increase is at a 3.34-to-one ratio. The gearbox assembly 90 may be an epicyclic gearbox, such as a planetary gearbox as shown, that provides rotating engagement between the fan-turbine rotor assembly 24 and an axial compressor rotor blade assembly 46. The gearbox assembly 90 is mounted for rotation between the static inner support housing 42 and the static outer support housing 44. The gearbox assembly 90 includes a sun gear 92, which rotates the axial compressor 22, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The sun gear 92 is rotationally engaged with the axial compressor rotor blade assembly 46 at a splined interconnection 100 or the like.

It should be noted that the gearbox assembly 90 could utilize other types of gear arrangements or other gear ratios and that the gearbox assembly 90 could be located at locations other than aft of the axial compressor 22. For example, the gearbox assembly 90 could be located at the front end of the axial compressor 22. Alternatively, the gearbox assembly 90 could provide a speed decrease between the fan-turbine rotor assembly 24 and the axial compressor rotor blade assembly 46, or reverse rotational direction between the fan-turbine rotor assembly 24 and the axial compressor rotor blade assembly 46 via a plurality of second planet gears between the planet gears 93 and the ring gear 95.

As will be explained more fully below, the compressor rotor blade assembly 46 of the axial compressor 22 includes a plurality of compressor rotor blade assemblies 120, one of which is shown in FIGS. 3 and 4. Each compressor rotor blade assembly 120 includes a plurality of inner compressor blades 52 integrally formed with an annular rotor portion 122, such as by machining the inner compressor blades 52 and the rotor portion 122 from a single block of material. As can be seen more clearly in FIG. 4, an annular spacer portion 124 extends axially from the rotor portion 122 and has an inner radius $r_1$ that is greater than an inner radius $r_2$ of the rotor portion 122, thereby defining a recess 130 radially inwardly of the spacer portion 124. A pair of annular seals 128 may project radially outwardly from the spacer portion 124. In the embodiment shown, the annular seals 128 are integrally-formed with the spacer portion 124 such that they rotate with the compressor blades 52 and seal against the inner diameter of the compressor vanes 54. Because the bolted flanges have been eliminated, the torque required to drive the inner compressor blades 52 is now carried from one compressor rotor blade assembly 120 to the adjacent one, using either friction and/or some type of torque carrying feature machined into the rearward end 125 of the spacer portion 124 and/or the mating forward end 127 of the rotor portion 122. One such feature is shown in FIGS. 3 and 4 as a series of interlocking axial projections 126 disposed about the circumference of the rearward end 125 of the spacer portion 124. Complementary interlocking recesses 132 could be disposed in the mating forward end 127 of the rotor portion 122 of the rearwardly adjacent compressor rotor blade assembly 120.

Figure 6:
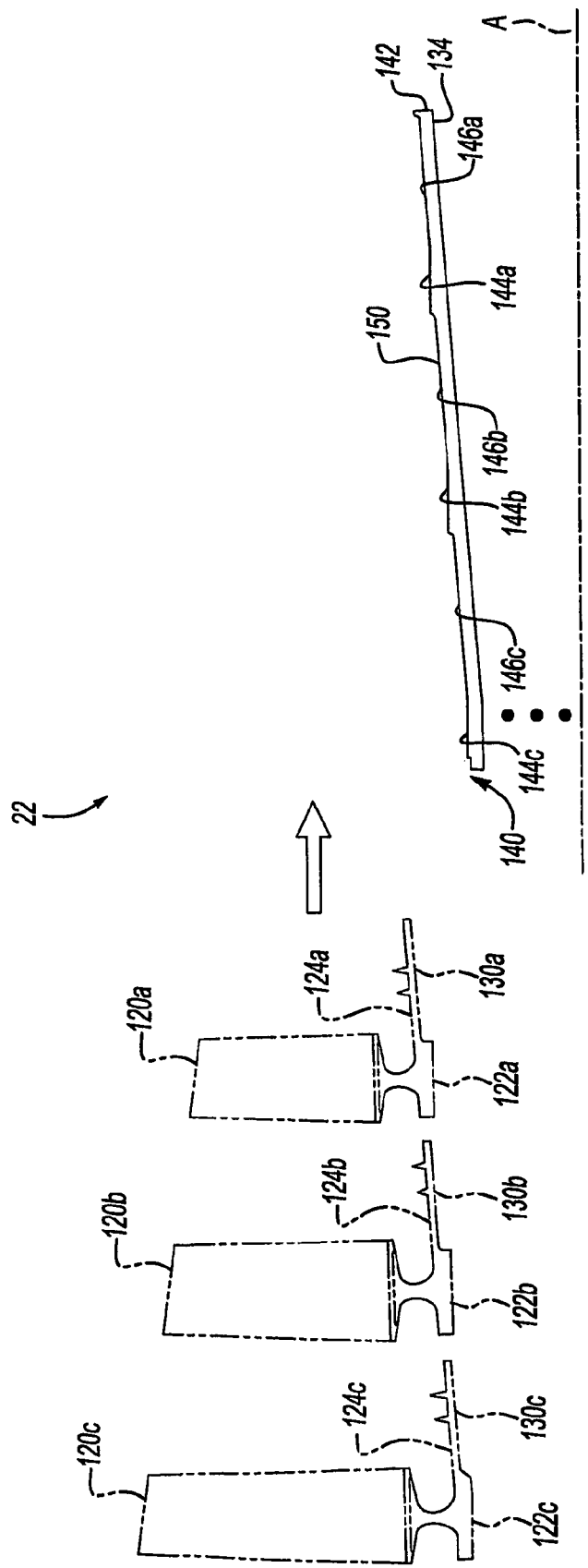
FIG. 6 is an enlarged, exploded sectional view of a portion of the axial compressor of FIG. 5.

Referring to FIGS. 5 and 6, the axial compressor 22 includes a plurality of the compressor rotor blade assemblies 120a-c, referenced as rear, middle and front compressor rotor blade assemblies 120a-c, respectively, for clarity. The compressor rotor blade assemblies 120a-c are mounted on a generally conical rotor center-tie 134 or hub having inner and outer diameters that increase from an externally-threaded forward end 140 to a rearward end 142. The outer surface 150 of the rotor center-tie 134 includes a plurality of cylindrical portions 144a-c that are generally parallel to the engine centerline A between conical portions 146a-c. The rear compressor rotor blade assembly 120a has the largest inner radius $r_a$ and the front compressor rotor blade assembly 120c has the smallest inner radius $r_c$. The middle compressor rotor blade assembly 120b has an inner radius $r_b$ sized between the other two. The rotor portion 122a-c, particularly the inner surface 153a-c of the rotor portion 122a-c, of each compressor rotor blade assembly 120a-c is generally parallel to the engine centerline A, although it should be understood that some slight taper might be helpful for assembly. The spacer portion 124a-c, particularly the inner surface 154a-c of the spacer portion 124a-c, is generally parallel to the conical portion 146a-c (i.e. parallel to the angle of the increase in diameter of the rotor center-tie 134a-c).

Referring more specifically to FIG. 6, for assembly, the rear compressor rotor blade assembly 120a is first slid onto the rotor center-tie 134, until the rotor portion 122a is mated with the cylindrical portion 144a of the rotor center-tie 134. When mounted, the spacer portion 124a of the compressor rotor blade assembly 120a defines the recess 130a with the conical portion 146a of the rotor center-tie 134. The middle compressor rotor blade assembly 120b is subsequently slid onto rotor center-tie 134 until the rotor portion 122b mates with the cylindrical portion 144b, and the spacer portion 124b abuts the adjacent rotor portion 122a of the rear compressor rotor blade assembly 120a. The front compressor rotor blade assembly 120c is then slid onto the rotor center-tie 134, with the rotor portion 122c mounted on the cylindrical portion 144c and with the spacer portion 124c abutting the rotor portion 122b of the adjacent middle compressor rotor blade assembly 120b.

In this manner, compressor rotor blade assemblies 120a-c are stacked on the rotor center-tie 134 and retain one another on the rotor center-tie 134. A nut 158 or other retaining device may be threaded or otherwise attached to an end, (e.g. the forward end 140) of the rotor center-tie 134, thereby retaining all of the compressor rotor blade assemblies 120a-c on the rotor center-tie 134.

Depending upon the configuration of the outer compressor vanes 54, the outer compressor vanes 54 may need to be assembled into the axial compressor in between mounting each of the compressor rotor blade assemblies 120a-c. The outer compressor vanes 54 could be held together with bolted flanges, or the outer compressor vanes 54 could also use the stacked rotor assembly configuration illustrated and described with respect to the inner compressor blade assemblies 120a-c. Although the compressor rotor blade assemblies 120a-c and center rotor-tie 134 are shown as used in a tip turbine engine 10, they could also be used in a conventional turbine engine. Furthermore, while low pressure compressor rotor blade assemblies were described herein in detail, the stacking arrangement of this invention may also be used with low and/or high pressure compressor vane assemblies. Furthermore, these stacking arrangements may also be used in counter-rotating compressor and/or turbine designs.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. An airfoil assembly for a turbine engine comprising:
    an annular portion disposed about an axis, the annular portion having an interlocking recess disposed in an axially forward end of the annular portion sized to receive a corresponding interlocking axial projection;
    a spacer portion extending from the annular portion, wherein the spacer portion extends axially from the annular portion and has an annular inner surface that is not parallel to an annular inner surface of the annular portion; and
    a plurality of airfoils extending radially from the annular portion, the plurality of airfoils integrally formed with the annular portion.

2. The airfoil assembly of claim 1 wherein the spacer portion is annular.

3. The airfoil assembly of claim 1 wherein the annular inner surface of the annular portion is generally parallel to the axis of the annular portion and wherein the inner surface of the spacer portion extends away from the axis of the annular portion as it extends axially away from the annular portion.

4. The airfoil assembly of claim 1 further including at least one annular seal extending radially from the spacer portion.

5. The airfoil assembly of claim 4, wherein the annular seal seals against the inner diameter of a compressor vane.

6. The airfoil assembly of claim 1 wherein the spacer portion has a radial thickness less than the annular portion.

7. The airfoil assembly of claim 1 wherein the plurality of airfoils extend radially outwardly from the annular portion.

8. The airfoil assembly of claim 1 wherein the annular portion is integrally formed with the plurality of airfoils from a single piece of material.

9. The airfoil assembly of claim 1 wherein the airfoil assembly is a compressor airfoil assembly and wherein the annular portion is an annular rotor portion.

10. The airfoil assembly of claim 1 wherein the airfoil assembly comprises at least one of: a low pressure compressor rotor blade assembly and a low pressure compressor vane assembly.

11. The airfoil assembly of clam 1 wherein the airfoil assembly is counter-rotating.

12. The airfoil assembly of claim 1, wherein the interlocking axial projection is disposed about a circumference of a axially rearward end of a second spacer portion.

13. An axial compressor for a turbine engine comprising:
    a rotor center-tie;
    a first compressor rotor airfoil assembly having a first annular portion, the first annular portion coaxially mounted to the rotor center-tie such that the first annular portion directly abuts the rotor center-tie; and
    a second compressor rotor airfoil assembly having a second annular portion, the second annular portion coaxially mounted to the rotor center-tie such that the second annular portion directly abuts the rotor center-tie, wherein the first compressor rotor airfoil assembly includes a first spacer portion extending axially from the first annular portion, the first spacer portion abutting the second compressor rotor airfoil assembly.

14. The axial compressor of claim 13 wherein the first compressor rotor airfoil assembly includes a first plurality of airfoils extending radially from the first annular portion, and the second compressor rotor airfoil assembly includes a second plurality of airfoils extending radially from the second annular portion.

15. The axial compressor of claim 14 wherein the first annular portion is integrally formed with the first plurality of airfoils.

16. The axial compressor of claim 13 wherein the first spacer portion is annular.

17. The axial compressor of claim 16 further including at least one annular seal extending radially from the first spacer portion.

18. The axial compressor of claim 13 wherein the first spacer portion has a radial thickness less than a radial thickness of the first annular portion.

19. The axial compressor of claim 13 wherein the rotor center-tie has an axially-forward end with a diameter different from a diameter of an axially-rearward end.

20. The axial compressor of claim 19 wherein the rotor center-tie has an outer surface with a plurality of cylindrical portions, the first annular portion of the first compressor rotor airfoil assembly and the second annular portion of the second compressor rotor airfoil assembly each mounted on one of the cylindrical portions.

21. The axial compressor of claim 19, wherein a diameter of the rotor center tie from the axially forward end to the axially rearward end does not decrease.

22. The axial compressor of claim 13 installed in a tip turbine engine, wherein core airflow through the axial compressor is axially compressed by the first and second pluralities of airfoils and then centrifugally compressed in interiors of a plurality of fan blades in the tip turbine engine.

23. The axial compressor of claim 13, wherein a first radius defined from the first annular portion to the rotor center-tie is greater than a second radius defined from a second annular portion to the center rotor-tie.

24. The axial compressor of claim 13, wherein the spacer portion and the rotor center-tie define a recess.

25. The airfoil assembly of claim 13, wherein the first annular portion contacts the rotor center-tie and the second annular portion contacts the rotor center-tie.

26. A method for assembling airfoil assemblies for a turbine engine including the steps of:
a) mounting a first annular portion of a first airfoil assembly onto a hub such that the first annular portion directly abuts the hub; and
b) after said step a), mounting a second annular portion of a second airfoil assembly onto the hub such that the second annular portion directly abuts the hub,
wherein at least one of the first airfoil assembly and the second airfoil assembly includes an integral spacer portion abutting the other of the first airfoil assembly and the second airfoil assembly after said step b).

27. The method of claim 26 wherein the first airfoil assembly further includes a first plurality of airfoils extending radially from the first annular portion, the second airfoil assembly including a second plurality of airfoils extending radially from the second annular portion.

28. The method of claim 27 wherein the first plurality of airfoils are integrally formed with the first airfoil assembly.

29. The method of claim 26 further including the step of installing the hub into a tip turbine engine, wherein the hub is rotatably driven by a turbine operatively coupled to a plurality of fan blades.

30. The method of claim 26, wherein the first annular portion contacts the rotor center-tie and the second annular portion contacts the rotor center-tie.

31. A rotor center-tie for an axial compressor for a turbine engine wherein the rotor center-tie is at least substantially radially symmetric about an axis, the rotor center-tie having an axially forward end with a diameter different from a diameter of an axially rearward end, the rotor center-tie including an outer surface with a plurality of cylindrical portions for receiving annular portions of compressor rotor assemblies thereon, including at least one conical portion between the cylindrical portions.

32. The rotor center-tie of claim 31 wherein one of the cylindrical portions has a diameter greater than a diameter of another one of the cylindrical portions.

33. The rotor center-tie of claim 31 wherein at least one of the axially forward end and the axially rearward end includes a retaining mechanism for retaining the compressor rotor assemblies thereon.

34. An axial compressor for a turbine engine comprising:
a rotor center-tie;
a first compressor rotor airfoil assembly having a first annular portion, the first annular portion coaxially mounted to the rotor center-tie such that the first annular portion directly abuts the rotor center-tie; and
a second compressor rotor airfoil assembly having a second annular portion, the second annular portion coaxially mounted to the rotor center-tie such that the second annular portion directly abuts the rotor center-tie, wherein the rotor center-tie includes an outer surface with a plurality of cylindrical portions for receiving annular portions of compressor rotor assemblies thereon, wherein at least one conical portion is between the plurality of cylindrical portions.

35. The axial compressor of claim 34, wherein an inner surface of the spacer portion is generally parallel to the conical portion.

* * * * *